(12) United States Patent
Tao et al.

(10) Patent No.: US 11,709,587 B2
(45) Date of Patent: Jul. 25, 2023

(54) SCREEN RECORDING METHOD AND SCREEN RECORDING DEVICE IMPLEMENTING THE SAME

(71) Applicant: SAMSUNG ELECTRONICS CO., LTD., Suwon-si (KR)

(72) Inventors: Feng Tao, Guangdong (CN); Xianliang Zhong, Guangdong (CN); Suxian Zhang, Guangdong (CN)

(73) Assignee: SAMSSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 17/366,961

(22) Filed: Jul. 2, 2021

(65) Prior Publication Data
US 2022/0011925 A1 Jan. 13, 2022

(30) Foreign Application Priority Data
Jul. 7, 2020 (CN) .......................... 202010646148.8

(51) Int. Cl.
*G06F 3/04842* (2022.01)
*G06F 9/451* (2018.01)
*G06F 3/16* (2006.01)

(52) U.S. Cl.
CPC ............ *G06F 3/04842* (2013.01); *G06F 3/16* (2013.01); *G06F 9/453* (2018.02); *G06F 2203/04803* (2013.01)

(58) Field of Classification Search
CPC ........ G06F 3/04842; G06F 3/16; G06F 9/453; G06F 2203/04803
See application file for complete search history.

(56) References Cited

U.S. PATENT DOCUMENTS

| | | | | |
|---|---|---|---|---|
| 9,176,703 | B2* | 11/2015 | Kim | .................. H04N 21/4438 |
| 9,377,991 | B1* | 6/2016 | Rapport | ................ G06F 16/438 |
| 10,986,145 | B2 | 4/2021 | Park | |
| 11,323,653 | B1* | 5/2022 | Voss | ..................... H04N 23/633 |
| 2007/0300179 | A1 | 12/2007 | Friedlander | |

(Continued)

FOREIGN PATENT DOCUMENTS

| CN | 102790921 A | 11/2012 |
|---|---|---|
| KR | 10-1928923 B1 | 12/2018 |

OTHER PUBLICATIONS

Communication dated Oct. 14, 2022 issued by the International Examining Authority in International Application No. PCT/KR2021/008185.

(Continued)

*Primary Examiner* — Tadesse Hailu
(74) *Attorney, Agent, or Firm* — Sughrue Mion, PLLC

(57) ABSTRACT

A screen recording method includes displaying an interface including a plurality of split screen areas; determining a target object in response to an initiation of a screen recording function, the determined target object including at least one of the plurality of split screen areas; based on a determination that the target object includes a plurality of audio sources that are playing at the same time, receiving a selection of at least one audio source among the plurality of audio sources; and recording screen display content and the at least one audio source of the target object to generate a screen recording file.

20 Claims, 10 Drawing Sheets

(56) References Cited

U.S. PATENT DOCUMENTS

| | | | |
|---|---|---|---|
| 2010/0123785 A1* | 5/2010 | Chen | H04N 23/611 |
| | | | 382/118 |
| 2011/0013075 A1* | 1/2011 | Kim | H04N 7/147 |
| | | | 348/370 |
| 2011/0102442 A1 | 5/2011 | Ibrahim et al. | |
| 2013/0110565 A1* | 5/2013 | Means, Jr. | G06Q 10/063 |
| | | | 705/7.11 |
| 2013/0176246 A1* | 7/2013 | Kohigashi | G06F 3/041 |
| | | | 345/173 |
| 2014/0068503 A1* | 3/2014 | Yoon | G06F 3/04842 |
| | | | 715/790 |
| 2014/0205259 A1* | 7/2014 | Kamity | H04N 9/8063 |
| | | | 386/201 |
| 2015/0067726 A1* | 3/2015 | Glasser | H04L 65/765 |
| | | | 725/32 |
| 2015/0146879 A1* | 5/2015 | Nguyen | H04N 21/482 |
| | | | 381/74 |
| 2017/0010760 A1 | 1/2017 | Rapport et al. | |
| 2017/0177096 A1* | 6/2017 | Cheong | G06F 3/1454 |
| 2017/0192741 A1* | 7/2017 | Liu | H04R 3/00 |
| 2019/0172422 A1* | 6/2019 | Chen | H04N 21/4122 |
| 2019/0214055 A1* | 7/2019 | Alexandru | G11B 27/005 |
| 2019/0294408 A1* | 9/2019 | Choi | G06F 3/04855 |
| 2020/0042171 A1* | 2/2020 | Tao | G06F 9/451 |
| 2020/0052667 A1* | 2/2020 | Jeon | H04M 1/72454 |

OTHER PUBLICATIONS

Communication dated Sep. 17, 2021, issued by the International Searching Authority in counterpart International Application No. PCT/KR2021/008185 (PCT/ISA/220, 210, 237).

\* cited by examiner

SCREEN RECORDING METHOD AND SCREEN RECORDING DEVICE IMPLEMENTING THE SAME

CROSS-REFERENCE TO RELATED APPLICATION

This application claims priority from Chinese Patent Application No. 202010646148.8, filed on Jul. 7, 2020 with the China National Intellectual Property Administration, the disclosure of which is herein incorporated by reference in its entirety.

BACKGROUND

1. Field

The disclosure relates to the technical field of electronic terminals, and more particularly, to a screen recording method and a screen recording device.

2. Description of Related Art

Electronic terminals, such as mobile phones, smart phones, notebook computers, tablet computers, personal digital assistants, and the like, have been widely used in daily lives. The electronic terminal generally provides a screen recording function for recording screen contents (e.g., audio and video data). Moreover, the electronic terminal generally provides a split screen function. In a split screen mode, a plurality of applications (APPs) may be displayed in a plurality of split screen areas in the current screen. Each of the plurality of the APPs may play an audio file by using a system interface, since the each APP may obtain an audio play focus. If at least two APPs play audios simultaneously, the recorded sound during the screen recording will become a mixed sound from the at least two APPs.

SUMMARY

Example embodiments of the disclosure provide a screen recording method and a screen recording device. When one or more split screen areas are selected to be recorded in the presence of a plurality of split screen areas, only audio data of an application (APP) to which the selected split screen areas belong may be recorded, so that an image and a sound in the screen recording file correspond to each other without interference from other APPs.

According to an aspect of an example embodiment, provided is a screen recording method for an electronic terminal, including: displaying an interface including a plurality of split screen areas; determining a target object in response to an initiation of a screen recording function, the determined target object including at least one of the plurality of split screen areas; based on a determination that the target object includes a plurality of audio sources that are playing at the same time, receiving a selection of at least one audio source among the plurality of audio sources; and recording screen display content and the at least one audio source of the target object to generate a screen recording file.

The screen recording method may further include, in response to the initiation of the screen recording function, performing at least one of: highlighting each of the plurality of split screen areas or providing a user interface to receive a selection of the at least one of the plurality of split screen areas as the target object.

The recording may include distinguishably displaying a split screen area in which the target object is located and a split screen area in which a non-recording object is located.

The distinguishably displaying may include performing at least one of: displaying a recording flag in the split screen area in which the target object is located, or highlighting the split screen area in which the target object is located.

The recording may include, in response to receiving a selection of two or more audio sources from the plurality of audio sources, recording the two or more selected audio sources separately or in combination.

The recording may include selecting and recording an audio source of a largest split screen area, based on the target object being located in the largest split screen area of the plurality of split screen areas.

The screen recording method may include in response to the target object being changed, continuing to record screen display content and at least one audio source of the changed target object.

The recording may include determining an application to which the target object belongs based on a split screen area in which the target object is located; obtaining audio data of the application; and recording the screen display content and the obtained audio data of the target object.

The screen recording method may further include recording external environment sound of the electronic terminal while recording the screen display content and the at least one audio source of the target object.

The recording may include based on the target object being a part of an application, recording an audio source of the application in response to a selection of the audio source of the application, or in response to a ratio of an area of a split screen area in which the target object is located to an area of all split screen areas corresponding to the application exceeding a predetermined threshold.

According to an aspect of an example embodiment, provided is a screen recording device including: at least one memory; and at least one processor coupled to the at least one memory and configured to: display an interface including a plurality of split screen areas; determine a target object in response to an initiation of a screen recording function, wherein the determined target object includes at least one of the plurality of split screen areas; based on a determination that the target object includes a plurality of audio sources that are playing at the same time, receive a selection of at least one audio source among the plurality of audio sources; and record screen display content and the at least one audio source of the target object to generate a screen recording file.

The at least one processor may be further configured to, in response to the initiation of the screen recording function, perform at least one of: highlighting each of the plurality of split screen areas, or providing a user interface to receive a selection of the at least one of the plurality of split screen areas as the target object.

The at least one processor may be further configured to distinguishably display a split screen area to which the target object belongs and a split screen area to which a non-recording object belongs.

The at least one processor may be further configured to perform at least one of: displaying a recording flag in the split screen area in which the target object is located, or highlighting the split screen area in which the target object is located.

The at least one processor may be further configured to, in response to receiving a selection of two or more audio sources from the plurality of audio sources, record the two or more audio sources separately or in combination.

The at least one processor may be further configured to select and record an audio source of a largest split screen area, based on the target object being located in the largest split screen area of the plurality of split screen areas.

The at least one processor may be further configured to, in response to the target object being changed, continue to record screen display content and at least one audio source of the changed target object.

The at least one processor may be further configured to determine an application to which the target object belongs based on a split screen area in which the target object is located, obtain audio data of the application, and record the screen display content and the obtained audio data of the target object.

The at least one processor may be further configured to record external environment sound of the screen recording device while recording the screen display content and the at least one audio source of the target object.

According to an aspect of an example embodiment, provided is a non-transitory computer readable storage medium having a computer program stored thereon, wherein the computer program, when executed by a processor, implements the foregoing screen recording method for the electronic terminal.

BRIEF DESCRIPTION OF DRAWINGS

The above and other objects and features of embodiments of the disclosure will become more apparent from the following description taken in conjunction with the accompanying drawings, in which.

DETAILED DESCRIPTION

Figure 1:
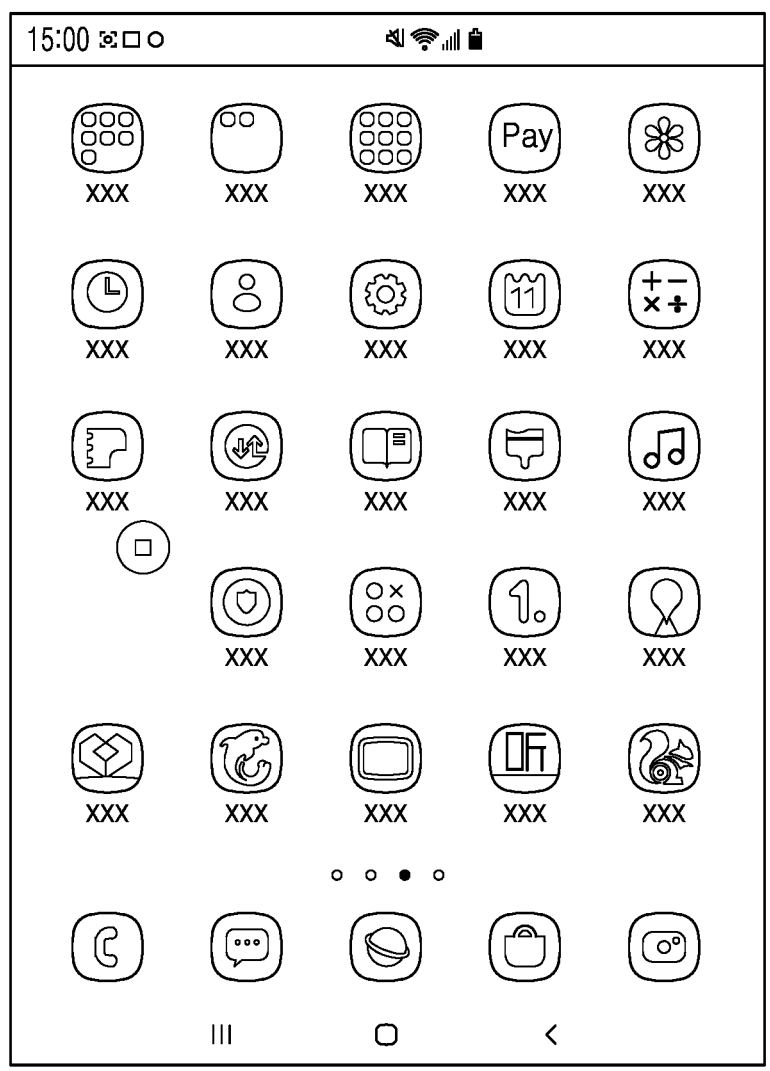
FIG. 1 is a diagram showing an example of performing a screen recording method in an electronic terminal.

The following detailed description is provided to assist in obtaining a thorough understanding of the methods, devices, and/or systems described herein. However, various changes, modifications, and equivalents of the methods, devices, and/or systems described herein will be apparent from an understanding of the disclosure herein. For example, the order of operations described herein is exemplary only and is not limited to those set forth herein, but may be altered as will be apparent after understanding the disclosure of the present application, except for operations that must occur in a particular order. Furthermore, description of features known in the art may be omitted for clarity and conciseness.

The features described herein may be implemented in different forms and should not be construed as limited to the examples described herein. Rather, the examples described herein have been provided to illustrate only some of the many possible ways of implementing the methods, devices, and/or systems described herein, which will be apparent upon understanding the disclosure of the present application.

As used herein, the term "and/or" comprises any and all combinations of one or more of the associated listed items.

Although the terms "first," "second", and "third" may be used herein to describe various types of members, components, regions, layers, or portions, these members, components, regions, layers, or portions should not be limited by these terms. These terms are used to distinguish one member, component, region, layer, or portion from another member, component, region, layer, or portion. Thus, a first member, component, region, layer, or portion discussed below could be termed a second member, component, region, layer, or portion without departing from the teachings of the disclosure.

In the description, when an element, such as a layer, region or substrate, is described as being "on", "connected to" or "bonded to" another element, the element may be on another element, directly connected to or bonded to another element, or one or more other elements may be present therebetween. However, when an element is described as being "directly on", "directly connected to" or "directly bonded to" another element, there may be no other elements therebetween.

The terminology used herein is for the purpose of describing various examples only and is not intended to limit the disclosure. The singular form is also intended to include the plural form, unless the context clearly indicates otherwise. The terms "include", "comprise", "have" specify the presence of stated features, numbers, operations, members, elements, and/or combinations thereof, but do not preclude the presence or addition of one or more other features, numbers, operations, elements, elements, and/or combinations thereof.

Unless otherwise defined, all terms (comprising technical and scientific terms) used herein have the same meaning as commonly understood by those skilled in the art to which this disclosure is a part after understanding this disclosure. Terms such as those defined in commonly used dictionaries are to be interpreted as having a meaning consistent with their meaning in the context of the relevant field and in the disclosure, and should not be interpreted in an idealized or overly formal sense, unless expressly so defined herein.

Furthermore, in the description of the examples, when it is considered that the detailed description of the well-known related structure or function will give rise to a vague explanation of the disclosure, such detailed description will be omitted.

Hereinafter, embodiments will be described in detail with reference to the accompanying drawings. However, the embodiments may be implemented in various forms and are not limited to the examples described herein.

FIG. 1 is a diagram showing an example of performing a screen recording method in an electronic terminal.

Referring to FIG. 1, an electronic terminal displays only a single application (APP) or a desktop application (APP) in a normal mode. In this case, when a screen recording function is initiated to execute the screen recording method, the current entire screen (comprising the content displayed by the current APP and audio source) will be recorded. Meanwhile, a recording control button will be provided on the screen. In response to the operation (e.g., clicking) on the recording control button, the recording will be completed, and a recording file, such as, but not limited to, a MP4 file, is generated.

Figure 2:
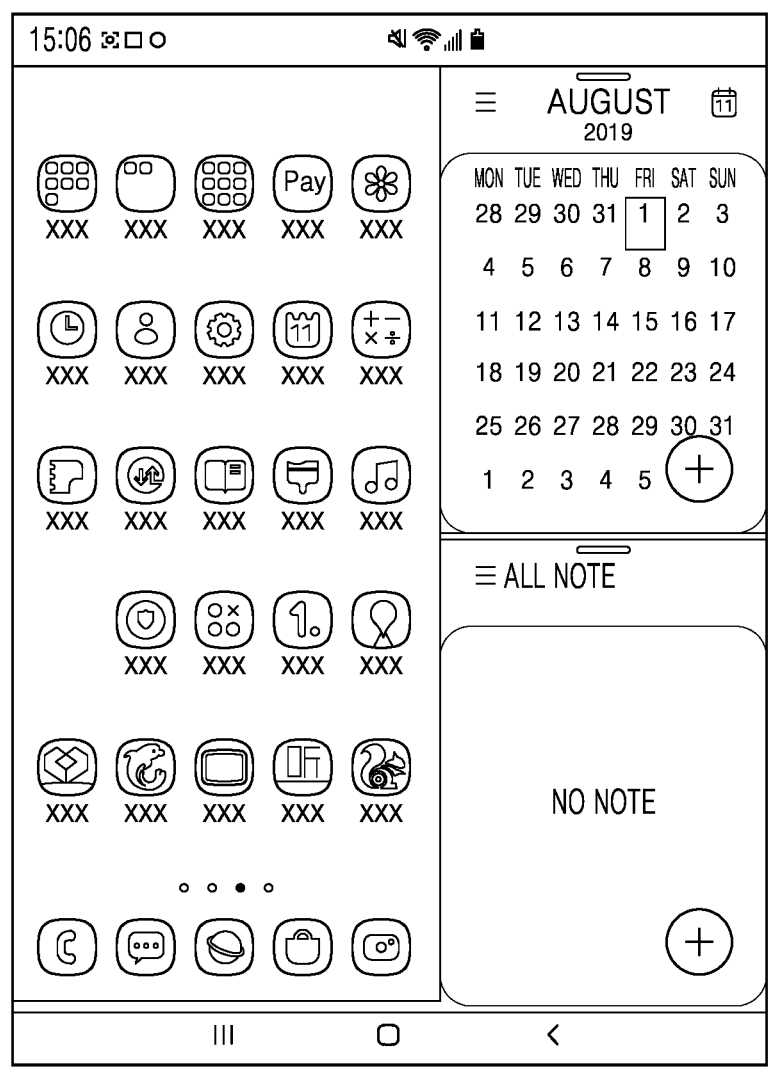
FIG. 2 is a diagram showing an example of a split screen mode of an electronic terminal.

FIG. 2 is a diagram showing an example of a split screen mode of an electronic terminal.

Referring to FIG. 2, when entering the split screen mode, the electronic terminal may display a plurality of split screen areas on the screen. A corresponding APP runs in each split screen area. For example, in FIG. 2, a desktop application (APP) runs to display a desktop in the left half of the screen, a calendar APP runs to display a calendar interface in the upper right part of the screen, and a note (or memo) APP runs to display a note (memo) section in the lower right part of the screen. However, this is merely an example and the disclosure is not limited thereto. The electronic terminal may display any number of split screen areas on the screen, and several split screen areas may belong to the same APP, that is, the display interface of one APP may be divided into several split screen areas for display.

Figure 3:
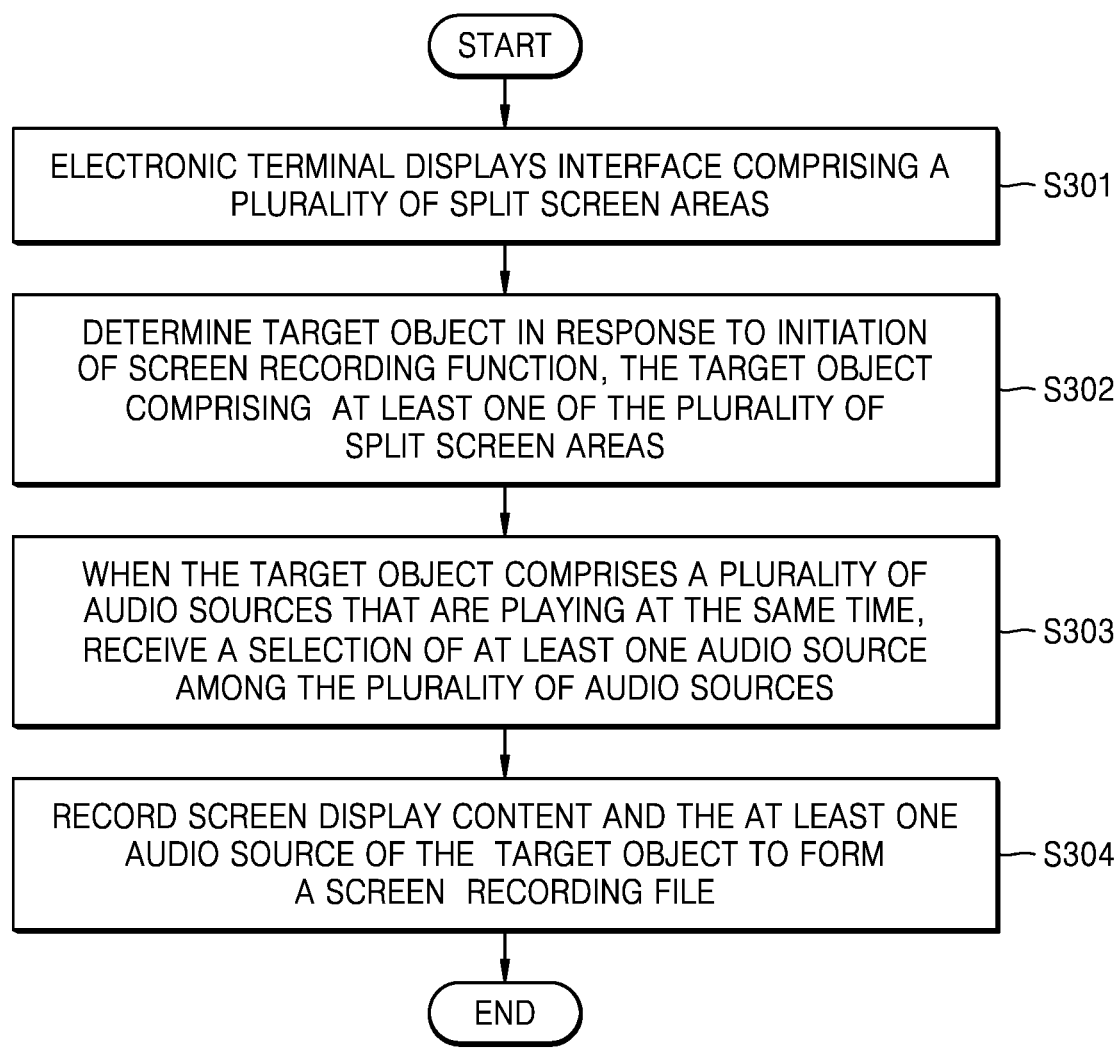
FIG. 3 is a flowchart illustrating a screen recording method for an electronic terminal according to an embodiment of the disclosure.

FIG. 3 is a flowchart illustrating a screen recording method for an electronic terminal according to an embodiment of the disclosure.

Referring to FIG. 3, in step S301, the electronic terminal displays an interface comprising a plurality of split screen areas, e.g., on a screen.

In step S302, the method comprises determining a to-be-recorded object (or a target object) in response to an initiation of a screen recording function. In an example embodiment, the determined target object comprises a number of split screen areas and the number of split screen areas comprises a plurality of audio sources that are playing at the same time.

In another example embodiment, at least one of the plurality of split screen areas may be determined as the target object in response to a selection operation of the plurality of split screen areas.

In an embodiment, each of the plurality of split screen areas may be highlighted to facilitate determination of the target object in response to the initiation of the screen recording function. For example, the plurality of split screen areas may be identified by highlighting a border of each split screen area to facilitate user's selection. In response to a user's selection of any one or more split screen areas (e.g., but not limited to, clicking), the selected one or more split screen areas may be determined as the target object. On the other hand, a user interface may be provided for selecting the at least one of the plurality of split screen areas as the target object, in response to the initiation of the screen recording function. For example, selection buttons (e.g., icons) may be provided on each split screen area. In response to a user's selection of any one or more selection buttons (e.g., icons), such as, but not limited to, clicking, one or more split screen areas corresponding to the selected one or more selection buttons (e.g., icons) may be determined as the target object. However, this is merely an example and the disclosure is not limited thereto. For example, each of the plurality of split screen areas may be highlighted simultaneously and the user interface for selecting the target object may be provided.

Next, in step S303, the method comprises, when the target object comprises the plurality of audio sources, receiving a selection of at least one audio source among the plurality of audio sources.

Next, in step S304, the method comprises recording screen display content and the at least one audio source of the target object to form a screen recording file, in response to determining at least one of the split screen areas as the target object and the selection of the at least one audio source. Here, when the recording is performed, a split screen area in which a recording object is located and a split screen area in which a non-recording object is located may be displayed distinguishably. For example, a recording flag (e.g., 'REC' displayed in red) may be displayed in the split screen area in which the target object is located, and/or the split screen area in which the target object is located may be highlighted (for example, a border of the split screen area in which the target object is located may be highlighted).

According to an embodiment of the disclosure, at least one audio source among the plurality of audio sources may be recorded in response to a selection of the at least one audio source. In this case, a user interface for selecting at least one audio source to be recorded may be provided. For example, selection buttons for selecting corresponding audio sources may be provided on the number of split screen areas. In response to selection (e.g., but not limited to, clicking) of one or more selection buttons, one or more audio sources corresponding to the selected one or more buttons may be recorded. Further, in response to a selection of a number of audio sources from the plurality of audio sources, the number of selected audio sources may be recorded separately or in combination. Alternatively, at least one audio source of the target object, which is located in a largest split screen area of the split screen areas, may be automatically selected to be recorded.

According to an embodiment of the disclosure, in step S303, a selection of at least one audio source among the plurality of audio sources may be received from the user manually or automatically in a predetermined method. For example, the APP to which the target object belongs may first be determined based on the split screen area in which the target object is located. Then, audio data of the determined APP is obtained. Finally, the screen display content of the target object and the obtained audio data are recorded. When recording the screen display content of the target object and the obtained audio data, audio data contained in a recording thread of an APP may be set to 0, wherein the APP corresponds to a split screen area among the plurality of split screen areas, in which a non-recording object is located. In this way, it is possible to record only the audio source of the split screen area in which the target object is located, but not the audio source of the split screen area in which other non-recording objects are located.

On the other hand, when the target object is a part of an APP (i.e., the split screen area in which the target object is located is a part of the display interface of the APP), audio source of the APP may be recorded in response to a selection of the audio source of the APP. For example, the audio source of the APP may be recorded in response to a selection operation of the user interface provided on the split screen area in which the target object is located. Alternatively, the audio source of the APP may be recorded in response to a ratio of an area of a split screen area in which the target object is located to an area of all split screen areas (i.e., the display interface of the APP) corresponding to the APP exceeding a predetermined threshold (e.g., but not limited to 50%). However, in response to the ratio of the area of the split screen area in which the target object is located to the area of all split screen areas corresponding to the APP not exceeding a predetermined threshold, the audio source of the APP may not be recorded. For example, in step S303 and S304, the external environment sound of the electronic terminal may be selected and recorded while recording the screen display content and the audio source of the target object.

According to an embodiment of the disclosure, when the screen display content and the at least one audio source of the target object are recorded, the target object may be changed. For example, the target object may be changed in response to the user's selection. Therefore, when the screen display content and the audio source of the target object are recorded, the user interface for selecting target object (for example, the respective split screen areas) may be displayed on the respective split screen areas. In response to a change to the target object (i.e., in response to a selection operation to the user interface for selecting target object), the screen display content and the audio source of the changed target object may be continually recorded.

According to an embodiment of the disclosure, after generating the screen recording file, in response to playing the screen recording file, a preset pattern may be displayed in split screen areas in which the non-recording objects are located. Specifically, the screen recording file may be displayed in the split screen area in which the target object is located, and the preset pattern may be displayed in the split screen areas in which other non-recording objects are located. For example, if the upper right portion area of the screen shown in FIG. 2 is determined to be a target object for which recording is to be performed, when playback is performed after a recording file is generated, the recording file is still played in the upper right portion area of the screen, and a preset pattern is displayed in the left half area and the lower right portion area of the screen in which the non-recording objects are located.

FIGS. 4 to 7 are diagrams showing examples of screen recording methods for an electronic terminal according to an embodiment of the disclosure.

Figure 4:
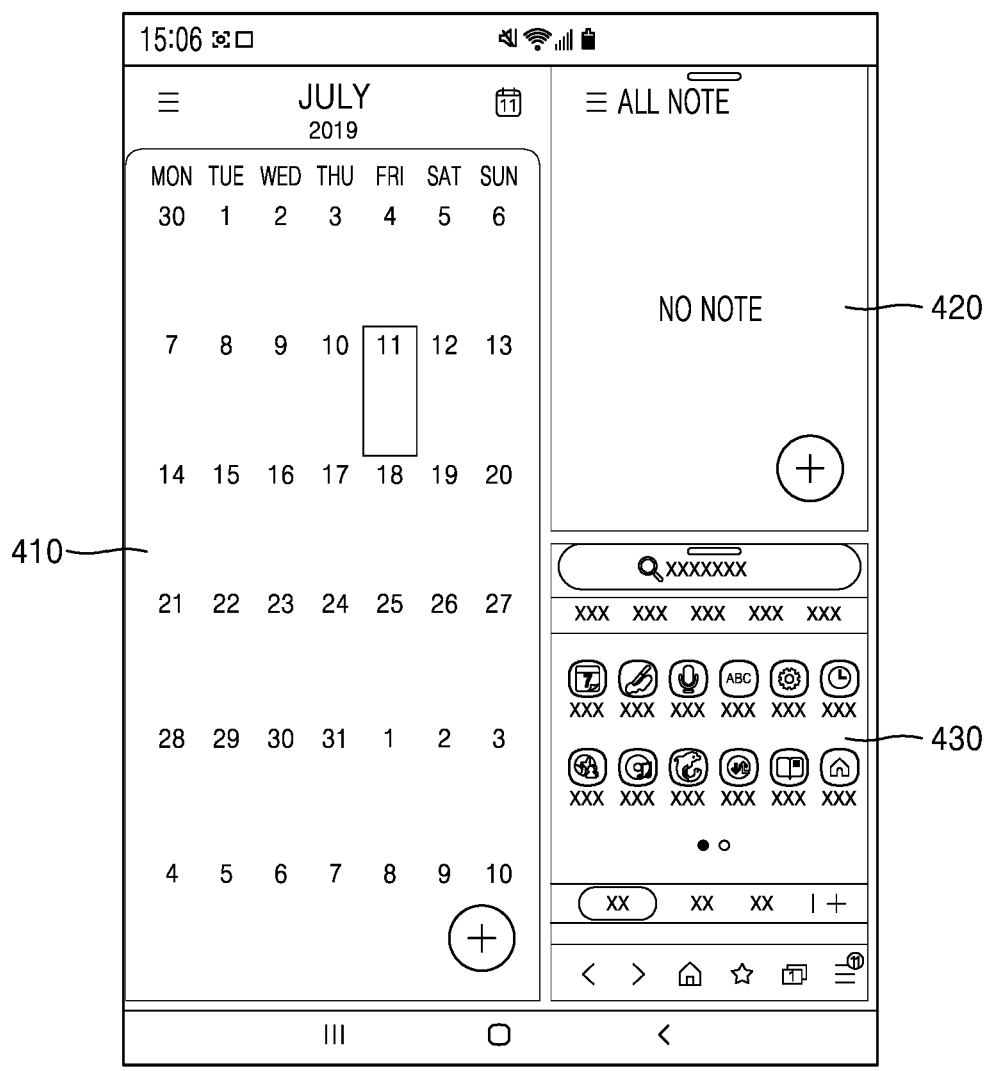
FIGS. 4 to 7 are diagrams showing examples of screen recording methods for an electronic terminal according to the embodiments of the disclosure.
Figure 5:
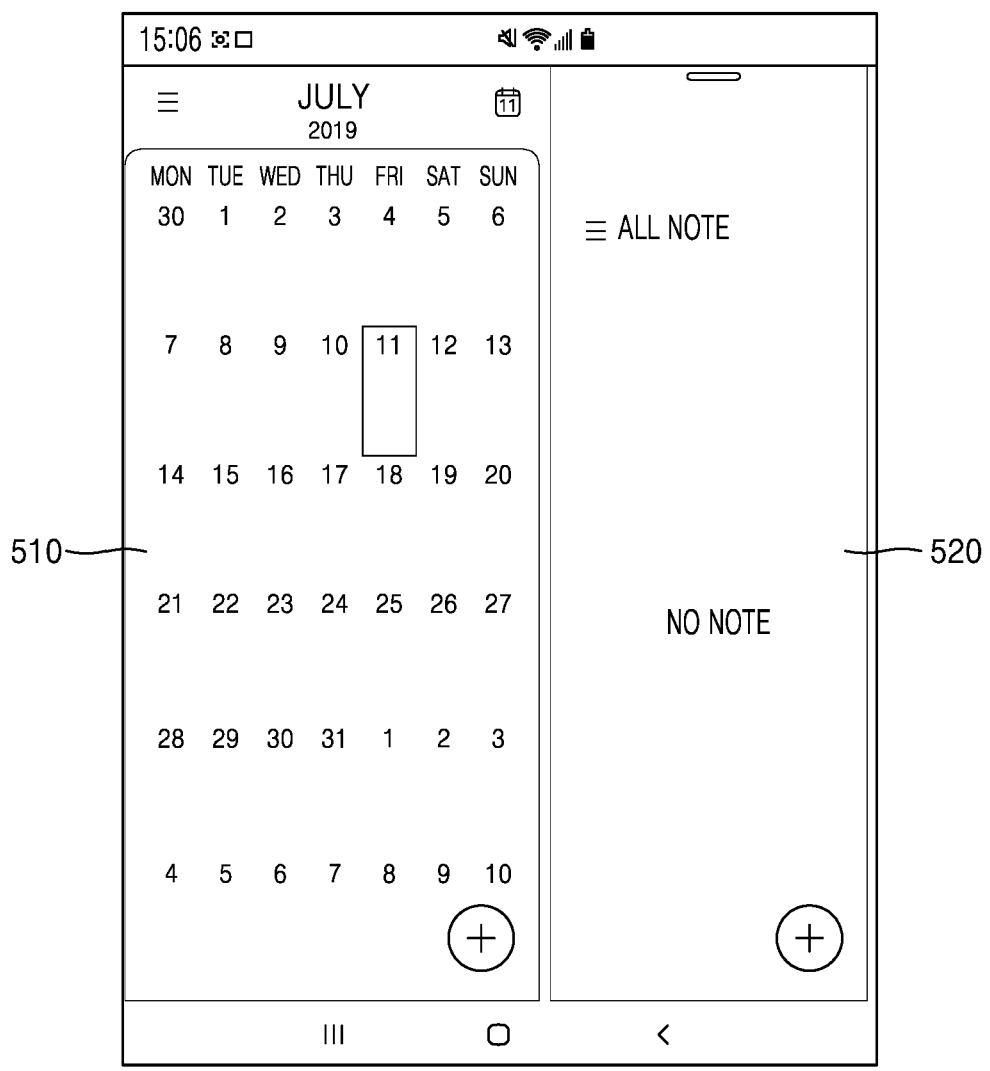

Referring to FIG. 4, the electronic terminal displays three split screen areas including a split screen area 1 410, a split screen area 2 420, and a split screen area 3 430 on the screen. In response to the initiation of the screen recording function, the borders of the split screen area 1 410, the split screen area 2 420, and the split screen area 3 430 are highlighted so that the user selects a target object. Referring to FIG. 5, the electronic terminal displays two split screen areas including a split screen area 1 510 and a split screen area 2 520 on the screen. In response to the initiation of the screen recording function, the borders of the split screen area 1 510 and the split screen area 2 520 are highlighted so that the user selects a target object. In FIGS. 4 and 5, the screen recording has not been started. At this time, when the Android application UI (activity) is displayed on the screen, the window management service (WindowManagerService) may create a connection to the SurfaceFlinger. With this connection, the window management service (WindowManagerService) may create a drawing surface (i.e., Surface object). The Surface object is used to render the application UI interface. The Surface object contains the width information, the height information thereof, the name of the application (app) to which the Surface object belongs, etc. The application may query all the Surface objects displayed on the current screen through the SurfaceFlinger service, and obtain the width information, the height information of each Surface object, the name of the app to which each Surface object belongs and the like, so as to determine the position of each split screen area and the app to which each split screen area belongs.

Here, the Window in the Android system is a rectangular area on the screen for drawing various UI elements and being able to respond to user input. Surface may be understood to be a canvas and a window on the screen is a Surface (object). The WindowManagerService assigns corresponding Surface (objects) to all windows and manages them, such as Z-order, position, size, window animation control, etc. The SurfaceFlinger is responsible for mixing the Surface data of the application UI according to Z-order and outputting to the FrameBuffer for display.

Figure 6:
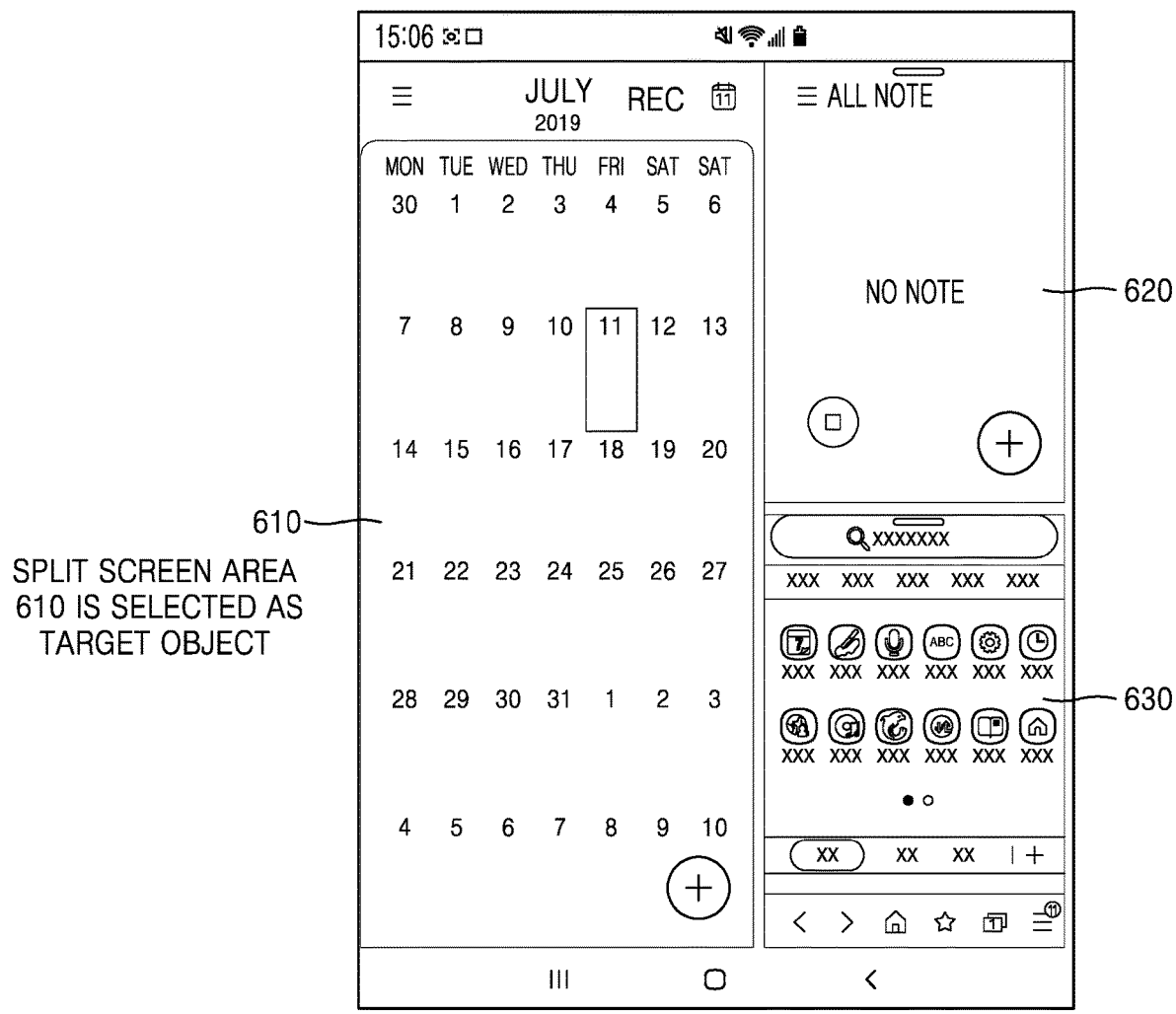

Referring to FIG. 6, the electronic terminal displays three split screen areas including a split screen area 1 610, a split screen area 2 620, and a split screen area 3 630 on the screen. In response to determining the split screen area 1 610 as a target object, the screen display content and the audio source of the split screen area 1 610 are recorded. In FIG. 6, the split screen area 1 610 is being recorded. At this time, the frame of the split screen area 1 610 may be highlighted, and/or a recording mark (REC) may be displayed in the split screen area 1 610. The REC does not appear in the screen recording file. On the other hand, if audio data of the APP to which the split screen area 1 610 belongs is being recorded and an audio is being played by other APPs at the same time, according to the identifier (e.g., APP UID in Android) of the APP to which the split screen area 1 610 belongs, only the audio data of the APP corresponding to the identifier may be transmitted to the encoder for encoding during recording, and then the encoded data is stored in the screen recording file.

Specifically, when a plurality of APPs play audios at the same time in the electronic terminal, there are a plurality of play threads in the electronic terminal. When the split screen area 1 610 is determined to be the target object, the UID of the APP corresponding to the split screen area 1 610 is set to the parameter AudioAttributes of the AudioRecord by AudioPlaybackCaptureConfiguration.addMatchingUid( ). When the recording is started, AudioRecord may create a new PatchRecord thread that will match the UID in the AudioAttributes. If the matching is successful, the PCM data (Pulse Code Modulation data) in the APP playback thread is copied to the PatchRecord thread, and the AudioRecord sends the PCM data to the encoder, and then the encoded data may be written to the screen recording file.

Here, AudioPlaybackCaptureConfiguration is an attribute-related API interface designed for recording in the Android system, comprising attribute values such as Usages and mUids used by the current APP. AudioRecord is an API interface for recording audio in the Android system. One of the parameters of this interface is AudioAttributes, which comprises AudioSource, the AudioPlaybackCaptureConfiguration variable therein and the like. PCM data refers to the quantized and sampled digital audio signal (which is AD converted and may be played from a speaker). APP UID is an UID in the Android system for identifying an application (APP) that is assigned at the time of installation of the APP and that does not change during the time the APP is present in the electronic terminal. The ApplicationInfo of the UID information contained in the corresponding APP may be obtained by the PackageManager according to the packet name.

Figure 7:
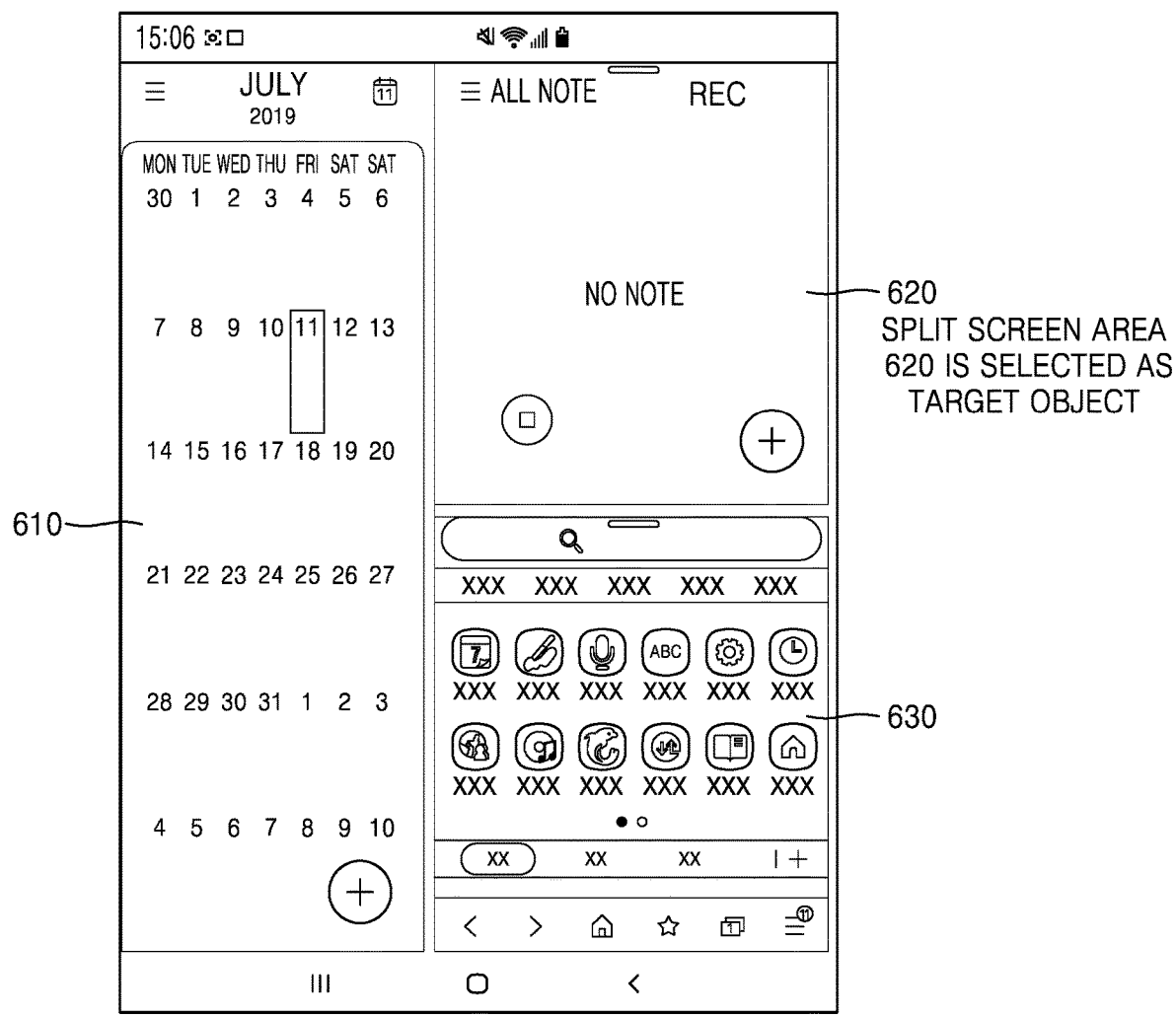

Referring to FIGS. 6 and 7, in response to the user's operation (for example, in response to the user's clicking 620 on the split screen area 2), the target object may be changed from the split screen area 1 610 to the split screen area 2 620. The screen display content and the audio source of the split screen area 2 620 may be continually recorded. Specifically, in response to the change of the target object, the AudioRecord of the audio source of the split screen area 1 610 may be stopped first; then the UID of the APP corresponding to the split screen area 2 620 is set to the AudioRecord parameter, and the recording is restarted to record the screen display content and the audio source of the split screen area 2 620.

According to the screen recording method for an electronic terminal according to the embodiment of the disclosure, if a screen recording is required when playing a game live with the electronic terminal, only the screen of the current game APP may be selected, and only the sound of the current game APP is recorded when the screen is recorded, so that the sound played by other APPs does not cause interference. In addition, since the ambient sound and the system sound are separated at the time of recording the screen, the sound of the APP may be recorded separately at the time of recording the screen, or both the sound of the APP and the ambient sound may be selected to be recorded. Further, if the determined target object (i.e., the split screen area) is only a part of the display interface of the APP, a user interface may be provided so that the user selects whether to record the audio source of the APP or the audio source of the APP may be automatically recorded if the split screen area in which the target object is located is greater than a predetermined threshold value. In addition, when a number of split screen areas are selected for recording, the audio source of the APP corresponding to the largest split screen area of the split screen areas may be recorded. In addition, when the audio source for a certain APP is selected to be recorded, all the audio data in the recording thread of the other applications may be set to 0, so that only the audio source of the selected APP and the ambient sound are recorded.

Figure 8:
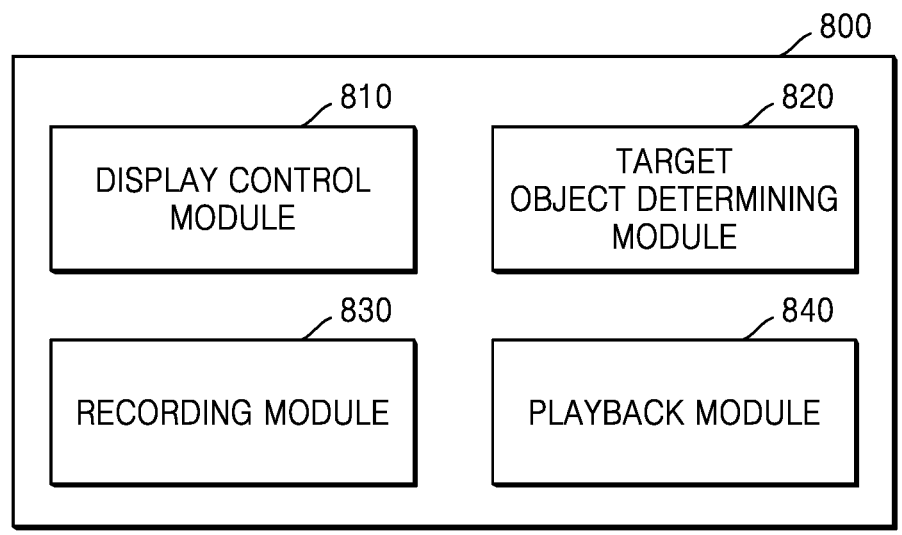
FIG. 8 is a block diagram showing a screen recording device for an electronic terminal according to an embodiment of the disclosure.

FIG. 8 is a block diagram illustrating a screen recording device for an electronic terminal according to an embodiment of the disclosure.

Referring to FIG. 8, a screen recording device 800 for an electronic terminal may include a display control module 810, a target object determining module 820, and a recording module 830.

The display control module 810 may control the electronic terminal to display an interface comprising a plurality of split screen areas. The target object determining module 820 may determine a target object in response to the initiation of the screen recording function and the recording module 830 may record the screen display content and the audio source of the determined target object to form a screen recording file in response to determining at least one of the plurality of split screen areas as the target object.

The display control module 810 may highlight each of the plurality of split screen areas in response to the initiation of the screen recording function to facilitate determination of the target object. On the other hand, the display control module 810 may provide a user interface for selecting at least one of the plurality of split screen areas as the target object. The target object determining module 820 may determine at least one of the plurality of split screen areas as the target object in response to a selection operation of the plurality of split screen areas.

During recording, the recording module 830 may control the terminal to distinguishably display a split screen area in which a recording object is located and a split screen area in which a non-recording object is located. For example, the recording module 830 may control the electronic terminal to display a recording flag in the split screen area in which the target object is located, and/or control the electronic terminal to highlight the split screen area in which the target object is located. When the target object comprises a number of split screen areas and the number of split screen areas comprise a plurality of audio sources respectively, the recording module 830 may record at least one audio source of the plurality of audio sources in response to a selection of the at least one audio source. Further, in response to selecting a number of audio sources from the plurality of audio sources, the recording module 830 may record the number of selected audio sources separately or in combination. Alternatively, the recording module 830 may select and record audio sources of the target object, which are located in a largest split screen area of the split screen areas.

During the recording, the recording module 830 may determine the application to which the target object belongs based on the split screen area in which the target object is located, obtain the audio data of the determined application, and record the screen display content of the target object and the obtained audio data. During the recording, the recording module 830 may set audio data in a recording thread of an application to 0, wherein the application corresponds to a split screen area of the plurality of split screen areas, in which a non-recording object is located. When the target object is a part of the APP, the recording module 830 may record the audio source of the APP in response to a selection of the audio source of the APP. Alternatively, the recording module 830 may record the audio source of the APP in response to a ratio of an area of a split screen area in which the target object is located to an area of all split screen areas corresponding to the APP exceeding a predetermined threshold. The recording module 830 may record the external ambient sound of the electronic terminal while recording the screen display content and the audio source of the target object. In an embodiment, the recording module 830 may continue to record the screen display content and the audio source of the changed target object in response to the change of the target object.

According to an embodiment of the disclosure, the screen recording device 800 for the electronic terminal may further comprise a playback module 840. In response to playing the screen recording file, the playback module 840 may display the preset pattern in the split screen area where the non-recording object is located.

Figure 9:
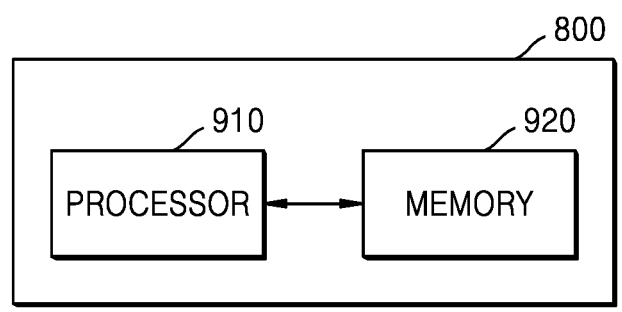
FIG. 9 is a block diagram illustrating a screen recording device according to an embodiment of the disclosure.

FIG. 9 is a block diagram illustrating a screen recording device according to an embodiment of the disclosure.

Referring to FIG. 9, a screen recording device 800 may include a processor 910 and a memory 920. The processor 910 may include, but is not limited to, a central processing unit (CPU), a graphics processor (GPU), a neural processing unit (NPU), an application processor (AP), an arithmetic logic unit (ALU), a digital signal processor (DSP), a microcomputer, a field programmable gate array (FPGA), an on-chip system (SoC), a programmable logic unit, a microprocessor, an application specific integrated circuit (ASIC), and the like. The memory 920 stores a computer program to be executed by processor 910. The memory 920 comprises high speed random access memory and/or non-volatile computer-readable storage media. When the processor 910 executes the computer program stored in the memory 920, the screen recording method for the screen recording device 800 as described above may be implemented.

In an example embodiment, the screen recording device 800 may be a mobile terminal.

Figure 10:
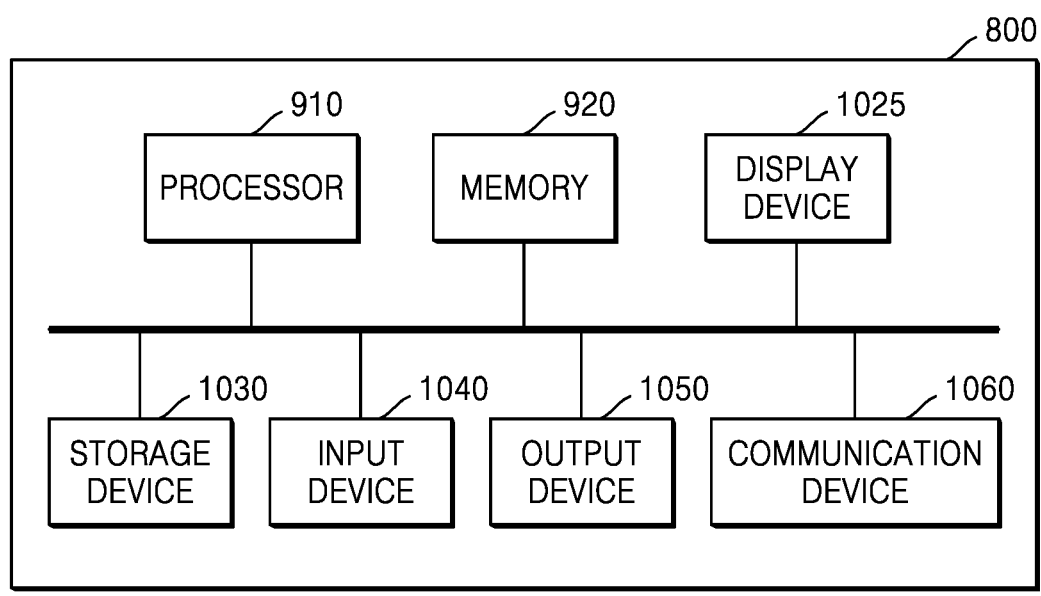
FIG. 10 is other block diagram illustrating a screen recording device according to an embodiment of the disclosure.

FIG. 10 is other block diagram illustrating a screen recording device according to an embodiment of the disclosure.

Referring to FIG. 10, the screen recording device 800 may include a processor 910 and a memory 920 of FIG. 9. And the screen recording device 800 may further include a display device 1025, a storage device 1030, an input device 1040, an output device 1050, and a communication device 1060. The above-mentioned various elements of the screen recording device 800 may communicate with each other through a communication bus. The display device 1025 may display various user interfaces and/or application interfaces. For example, the display device 1025 may display the same or different user interfaces and/or application interfaces in multiple split screen areas. The storage device 1030 comprises a computer-readable storage medium. The storage device 1030 stores a greater amount of information and have a longer storage time than the memory 920. For example, the storage device 1030 comprises a storage medium such as a hard disk, an optical disk, and a solid-state drive. The input device 1040 receives input from a user through tactile, video, audio, or touch input. For example, input device 1040 comprises a keyboard, mouse, touch screen, microphone, or any other device that detects input from a user and transmits the detected input to screen recording device 800. The output device 1050 provides the output of the screen recording device 800 to the user through a visual, auditory, or tactile channel. The output device 1050 comprises, for example, a display, a touch screen, a speaker, a vibration generator, or any other device that provides output to a user. The communication device 1060 communicates with external devices through a wired or wireless network.

A screen recording method according to an example embodiment of the disclosure may be written as a computer program and stored in a computer readable storage medium. When the computer program is executed by the processor, the screen recording method as described above may be implemented. Examples of the computer-readable storage medium include read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, blue or optical disk memory, hard disk drive (HDD), solid state disk (SSD), card memory (such as a multimedia card, a secure digital (SD) card or an extreme digital (XD) card), magnetic tape, floppy disk, magneto-optical data storage, optical data storage, hard disk, solid state disk, and any other device. The computer-readable storage medium is configured to store a computer program and any associated data, data files, and data structures in a non-transitory manner and to provide the computer program and any associated data, data files, and data structures to a processor or computer to enable the processor or computer to execute the computer program. In one example, the computer program and any associated data, data files, and data structures are distributed over a networked computer system such that the computer program and any associated data, data files, and data structures are stored, accessed, and executed in a distributed manner by one or more processors or computers.

According to the screen recording method and the screen recording device according to the embodiment of the disclosure, when one or more split screen areas are selected to be recorded in the presence of a plurality of split screen areas, only the audio data of the application (APP) to which the selected split screen areas belong may be recorded, so that the picture and the sound in the screen recording file correspond to each other without interference from other APPs, and the user experience is improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to embodiments thereof, it will be understood by those skilled in the art that various changes in form and detail may be made therein without departing from the spirit and scope of the disclosure as defined by the appended claims.

What is claimed is:

1. A screen recording method for an electronic terminal, comprising:
    displaying an interface comprising a plurality of split screen areas;
    determining a target object in response to an initiation of a screen recording function, the determined target object comprising at least one of the plurality of split screen areas;
    based on a determination that the target object comprises a plurality of audio sources that are playing at the same time, receiving a selection of at least one audio source among the plurality of audio sources; and
    recording screen display content and the at least one audio source of the target object to generate a screen recording file.

2. The screen recording method according to claim 1, further comprising, in response to the initiation of the screen recording function, performing at least one of:
    highlighting each of the plurality of split screen areas or providing a user interface to receive a selection of the at least one of the plurality of split screen areas as the target object.

3. The screen recording method according to claim 1, wherein the recording comprises:
    distinguishably displaying a split screen area in which the target object is located and a split screen area in which a non-recording object is located.

4. The screen recording method according to claim 3, wherein the distinguishably displaying comprises performing at least one of:
    displaying a recording flag in the split screen area in which the target object is located, or highlighting the split screen area in which the target object is located.

5. The screen recording method according to claim 1, wherein the recording comprises, in response to receiving a selection of two or more audio sources from the plurality of audio sources, recording the two or more selected audio sources separately or in combination.

6. The screen recording method according to claim 1, wherein the recording comprises:
selecting and recording an audio source of a largest split screen area, based on the target object being located in the largest split screen area of the plurality of split screen areas.

7. The screen recording method according to claim 1, further comprising:
in response to the target object being changed, continuing to record screen display content and at least one audio source of the changed target object.

8. The screen recording method according to claim 1, wherein the recording comprises:
determining an application to which the target object belongs based on a split screen area in which the target object is located;
obtaining audio data of the application; and
recording the screen display content and the obtained audio data of the target object.

9. The screen recording method according to claim 1, further comprising:
recording external environment sound of the electronic terminal while recording the screen display content and the at least one audio source of the target object.

10. The screen recording method according to claim 1, wherein the recording comprises:
based on the target object being a part of an application, recording an audio source of the application in response to a selection of the audio source of the application, or in response to a ratio of an area of a split screen area in which the target object is located to an area of all split screen areas corresponding to the application exceeding a predetermined threshold.

11. A screen recording device comprising:
at least one memory; and
at least one processor coupled to the at least one memory and configured to:
display an interface comprising a plurality of split screen areas;
determine a target object in response to an initiation of a screen recording function, wherein the determined target object comprises at least one of the plurality of split screen areas;
based on a determination that the target object comprises a plurality of audio sources that are playing at the same time, receive a selection of at least one audio source among the plurality of audio sources; and
record screen display content and the at least one audio source of the target object to generate a screen recording file.

12. The screen recording device according to claim 11, wherein the at least one processor is further configured to, in response to the initiation of the screen recording function, perform at least one of:
highlighting each of the plurality of split screen areas, or providing a user interface to receive a selection of the at least one of the plurality of split screen areas as the target object.

13. The screen recording device according to claim 11, wherein the at least one processor is further configured to distinguishably display a split screen area to which the target object belongs and a split screen area to which a non-recording object belongs.

14. The screen recording device according to claim 13, wherein the at least one processor is further configured to perform at least one of: displaying a recording flag in the split screen area in which the target object is located, or highlighting the split screen area in which the target object is located.

15. The screen recording device according to claim 11, wherein the at least one processor is further configured to, in response to receiving a selection of two or more audio sources from the plurality of audio sources, record the two or more audio sources separately or in combination.

16. The screen recording device according to claim 11, wherein the at least one processor is further configured to select and record an audio source of a largest split screen area, based on the target object being located in the largest split screen area of the plurality of split screen areas.

17. The screen recording device according to claim 11, wherein the at least one processor is further configured to, in response to the target object being changed, continue to record screen display content and at least one audio source of the changed target object.

18. The screen recording device according to claim 11, wherein the at least one processor is further configured to determine an application to which the target object belongs based on a split screen area in which the target object is located, obtain audio data of the application, and record the screen display content and the obtained audio data of the target object.

19. The screen recording device according to claim 11, wherein the at least one processor is further configured to record external environment sound of the screen recording device while recording the screen display content and the at least one audio source of the target object.

20. A non-transitory computer readable storage medium having a computer program stored thereon, wherein the computer program, when executed by a processor, implements the screen recording method for the electronic terminal according to claim 1.

* * * * *